(12) United States Patent
Takahashi (10) Patent No.: US 9,756,308 B2
(45) Date of Patent: Sep. 5, 2017

(54) COMMUNICATION CONTROL METHOD AND COMMUNICATION SYSTEM

(71) Applicant: Seiko Epson Corporation, Tokyo (JP)

(72) Inventor: Takumi Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/829,696

(22) Filed: Aug. 19, 2015

(65) Prior Publication Data

US 2016/0057401 A1  Feb. 25, 2016

(30) Foreign Application Priority Data

Aug. 22, 2014  (JP) ................................ 2014-168937

(51) Int. Cl.
*H04N 11/06*  (2006.01)
*H04N 11/24*  (2006.01)
*H04N 9/31*  (2006.01)

(52) U.S. Cl.
CPC ........... *H04N 11/06* (2013.01); *H04N 9/3182* (2013.01); *H04N 9/3185* (2013.01); *H04N 11/002* (2013.01)

(58) Field of Classification Search
CPC ....... H04N 21/43615; H04N 21/43635; H04N 21/33637; G09G 2370/12; G09G 2370/16; G09G 2370/06; G09G 2370/22
See application file for complete search history.

(56) References Cited

U.S. PATENT DOCUMENTS

| | | | | |
|---|---|---|---|---|
| 6,532,592 B1* | 3/2003 | Shintani | ............... | H04N 5/4403 348/734 |
| 7,861,017 B2* | 12/2010 | Agnihotri | .............. | H04N 5/765 348/512 |
| 8,378,791 B2* | 2/2013 | Ito | ......................... | H04N 5/765 340/12.29 |
| 8,417,841 B2* | 4/2013 | Nagai | ................... | H04L 67/141 710/15 |
| 8,683,533 B2* | 3/2014 | Nishimura | ............... | H04N 5/38 725/62 |
| 8,704,947 B2* | 4/2014 | Lai | ...................... | H04N 21/4402 348/441 |
| 8,918,544 B2* | 12/2014 | Chardon | .................. | H04N 5/44 710/15 |
| 8,972,626 B2* | 3/2015 | Sasaki | .................... | H04N 5/765 710/316 |

(Continued)

FOREIGN PATENT DOCUMENTS

JP  2010-015403 A  1/2010

*Primary Examiner* — Brian Yenke
(74) *Attorney, Agent, or Firm* — ALG Intellectual Property, LLC (57) ABSTRACT

In a display system, a wireless transmitter receives video data and a CEC command from an AV amplifier, determines whether the received CEC command is a preset command or not, generates a confirmation command if it is determined that the CEC command is a preset command, and transmits the video data and the CEC command received from the AV amplifier and the confirmation command, to a projector. The projector receives the video data, the CEC command and the confirmation command transmitted from the wireless transmitter, and determines whether the received CEC command and confirmation command correspond to each other or not.

13 Claims, 3 Drawing Sheets

(56) References Cited

U.S. PATENT DOCUMENTS

| | | | |
|---|---|---|---|
| 9,225,963 B2* | 12/2015 | Sakaniwa | H04N 13/0452 |
| 9,294,320 B2* | 3/2016 | Shimizu | H04L 5/06 |
| 2002/0167617 A1* | 11/2002 | Vornsand | H04N 5/775 |
| | | | 348/734 |
| 2006/0209745 A1* | 9/2006 | MacMullan | G06F 3/1454 |
| | | | 370/328 |
| 2008/0168504 A1* | 7/2008 | Yamada | H04N 5/44543 |
| | | | 725/58 |
| 2008/0180551 A1* | 7/2008 | Koike | G09G 5/006 |
| | | | 348/231.99 |
| 2008/0297520 A1* | 12/2008 | Montag | G09G 5/006 |
| | | | 345/501 |
| 2009/0089850 A1* | 4/2009 | Nakajima | H04N 5/775 |
| | | | 725/118 |
| 2009/0256963 A1* | 10/2009 | Sato | H04N 5/4401 |
| | | | 348/554 |
| 2009/0262256 A1* | 10/2009 | Asayama | H04N 5/60 |
| | | | 348/738 |
| 2009/0271530 A1* | 10/2009 | Ohkita | G09G 5/006 |
| | | | 710/3 |
| 2009/0285138 A1* | 11/2009 | Thomas | H04N 5/4403 |
| | | | 370/310 |
| 2009/0327467 A1* | 12/2009 | Cho | H04L 67/16 |
| | | | 709/223 |
| 2010/0003016 A1* | 1/2010 | Ishimaru | H04N 5/232 |
| | | | 386/224 |
| 2010/0008636 A1* | 1/2010 | Ohno | H04N 5/4401 |
| | | | 386/215 |
| 2010/0017645 A1* | 1/2010 | Kimoto | H04N 5/232 |
| | | | 714/4.1 |
| 2010/0103328 A1* | 4/2010 | Jang | H04N 5/268 |
| | | | 348/720 |
| 2010/0125678 A1* | 5/2010 | Chen | G08C 23/04 |
| | | | 710/5 |
| 2010/0157169 A1* | 6/2010 | Yoshida | G08C 23/04 |
| | | | 348/734 |
| 2010/0215333 A1* | 8/2010 | Kojima | G09G 5/006 |
| | | | 386/285 |
| 2010/0323761 A1* | 12/2010 | Yuasa | G06F 3/1454 |
| | | | 455/559 |
| 2011/0080485 A1* | 4/2011 | Kimoto | H04N 5/232 |
| | | | 348/192 |
| 2011/0099415 A1* | 4/2011 | Terauchi | H04L 12/2807 |
| | | | 714/5.1 |
| 2011/0115986 A1* | 5/2011 | Takezaki | H04N 21/43637 |
| | | | 348/734 |
| 2011/0154414 A1* | 6/2011 | Kimoto | H04L 25/0272 |
| | | | 725/78 |
| 2011/0156944 A1* | 6/2011 | Ward | H04L 12/2832 |
| | | | 341/176 |
| 2011/0194454 A1* | 8/2011 | Ohmae | H04N 21/4122 |
| | | | 370/252 |
| 2011/0209190 A1* | 8/2011 | Toba | H04L 12/282 |
| | | | 725/118 |
| 2011/0255470 A1* | 10/2011 | Fukami | H04L 12/2821 |
| | | | 370/328 |
| 2012/0008911 A1* | 1/2012 | Yoshida | H04N 5/85 |
| | | | 386/230 |
| 2012/0011535 A1* | 1/2012 | Eguchi | H04L 12/4625 |
| | | | 725/25 |
| 2012/0042346 A1* | 2/2012 | Yoshida | H04N 21/4122 |
| | | | 725/81 |
| 2012/0051290 A1* | 3/2012 | Murase | G06F 3/1454 |
| | | | 370/328 |
| 2012/0069894 A1* | 3/2012 | Sakimura | H04N 7/163 |
| | | | 375/240.02 |
| 2012/0133843 A1* | 5/2012 | Sakamoto | H04N 21/4104 |
| | | | 348/734 |
| 2012/0198286 A1* | 8/2012 | Koizumi | G06F 11/3055 |
| | | | 714/45 |
| 2012/0242905 A1* | 9/2012 | Inoue | H04N 21/4108 |
| | | | 348/705 |
| 2013/0016283 A1* | 1/2013 | Nissan-Cohen | H04N 21/4122 |
| | | | 348/552 |
| 2013/0155333 A1* | 6/2013 | Koizumi | H04N 5/4403 |
| | | | 348/734 |
| 2013/0174208 A1* | 7/2013 | Lee | H04N 21/4122 |
| | | | 725/109 |
| 2013/0179605 A1* | 7/2013 | Huang | H04L 65/4092 |
| | | | 710/20 |
| 2013/0238702 A1* | 9/2013 | Sheth | H04L 67/38 |
| | | | 709/204 |
| 2013/0266073 A1* | 10/2013 | MacInnis | H04N 7/56 |
| | | | 375/240.24 |
| 2014/0003794 A1* | 1/2014 | Hoshino | H04N 9/87 |
| | | | 386/263 |
| 2014/0289787 A1* | 9/2014 | Minemura | H04N 21/4126 |
| | | | 725/116 |
| 2014/0317218 A1* | 10/2014 | Chiba | H04L 41/0833 |
| | | | 709/208 |
| 2015/0006673 A1* | 1/2015 | Nair | H04N 5/765 |
| | | | 709/217 |
| 2015/0103253 A1* | 4/2015 | Higuchi | G09G 5/00 |
| | | | 348/705 |

\* cited by examiner

COMMUNICATION CONTROL METHOD AND COMMUNICATION SYSTEM

The entire disclosure of Japanese Patent Application No. 2014-168937, filed Aug. 22, 2014, is expressly incorporated by reference herein.

BACKGROUND

1. Technical Field

The present invention relates to a communication control method and a communication system.

2. Related Art

According to the related art, a technique in which a plurality of devices transmits and receives a command to control a communication counterpart device is known. For example, the HDMI (trademark registered) standard includes CEC (Consumer Electronics Control) in which a device controls another device with a command.

Some of communication devices using commands of this type have a measure to cope with the case where communication is not available (see, for example, JP-A-2010-015403). The device disclosed in JP-A-2010-015403 detects a cut-off of a device communicating on the basis of CEC and transmits a reset command to the device having the cut-off, so as to reset the device.

With the device disclosed in JP-A-2010-015403, while a communication cut-off can be coped with, it is difficult to cope with the case where a cut-off is not detected. For example, in the case where transmission/reception of a command temporarily fails and the command becomes absent, if communication becomes available again later, there is no cut-off and therefore no cut-off can be detected. However, there is a possibility that the absence of the command may cause inconsistency in the operation of the device.

SUMMARY

An advantage of some aspects of the invention is to provide a communication control method and a communication system which are capable of coping with communication failure in the case where a command is transmitted and received among a plurality of devices.

An aspect of the invention is directed to a communication control method for transmitting a command from a transmitting device to a receiving device including: causing the transmitting device to receive image data and a control command from an external device, determine whether the control command which is received is a preset first command or not, generate a second command if it is determined that the control command is the first command, and transmit the image data and the control command received from the external device and the second command, to the receiving device; and causing the receiving device to receive the image data, the control command, and the second command transmitted from the transmitting device, and determine whether the control command and the second command which are received correspond to each other or not.

According to this configuration, if the receiving device cannot receive a control command transmitted from the transmitting device, the receiving device can detect this reception failure. Therefore, the receiving device can detect and cope with communication failure.

In the communication control method, the receiving device may generate a third command and transmit the third command to the transmitting device if it is determined that the control command and the second command received from the transmitting device do not correspond to each other.

According to this configuration, if the receiving device determines that the reception of a control command has failed, the receiving device can cause the transmitting device to execute an operation to cope with this failure. Therefore, the receiving device and the transmitting device can collaboratively cope with communication failure.

In the communication control method, the transmitting device may transmit the third command to the external device if the third command transmitted from the receiving device is received.

According to this configuration, if the receiving device determines that the reception of a control command has failed, an inquiry on this failure can be made to the external device. Therefore, communication failure can be coped with.

In the communication control method, the transmitting device and the receiving device may transmit and receive data in an HDMI format. The first command may be a command already defined by the CEC. The second command may be a Vender Specific command.

According to this configuration, communication failure can be coped with by a technique conforming to the HDMI format, utilizing the Vender Specific command of the CEC.

In the communication control method, the transmitting device may wirelessly transmit the image data and the control command to the receiving device, and the receiving device may receive the image data and the control command wirelessly transmitted from the transmitting device.

According to this configuration, since the receiving device can determine that the reception of a wireless transmitted control command has failed, it is possible to cope with failure in wireless communication. Thus, the reliability of the system which wirelessly connects the transmitting device and the receiving device can be improved.

Another aspect of the invention is directed to a communication system including a transmitting device and a receiving device. The transmitting device includes: a first receiving unit which receives image data and a control command from an external device; a first transmitting unit which transmits a command to the receiving device; and a transmission control unit which determines whether the control command received by the first receiving unit is a preset first command or not, generates a second command if it is determined that the control command is the first command, and causes the first transmitting unit to transmit the image data and the control command received by the first receiving unit and the second command. The receiving device includes: a second receiving unit which receives the image data, the control command, and the second command transmitted from the transmitting device; and a reception control unit which determines whether the control command and the second command received by the second receiving unit correspond to each other or not.

According to this configuration, if the receiving device cannot receive a control command transmitted from the transmitting device, the receiving device can detect this reception failure. Therefore, the receiving device can detect and cope with communication failure.

In the communication system, the receiving device may have a second transmitting unit which transmits a command to the transmitting device. The reception control unit may generate a third command and cause the second transmitting unit to transmit the third command to the transmitting device if it is determined that the control command and the second command received by the second receiving unit do not correspond to each other.

According to this configuration, if the receiving device determines that the reception of a control command has failed, the receiving device can cause the transmitting device to execute an operation to cope with this failure. Therefore, the receiving device and the transmitting device can collaboratively cope with communication failure.

In the communication system, the first transmitting unit provided in the transmitting device may be a wireless transmission unit which wirelessly transmits data and a command. The second receiving unit provided in the receiving device may be a wireless reception unit which receives the data and command wirelessly transmitted from the first transmitting unit.

According to this configuration, since the receiving device can determine that the reception of a wireless transmitted control command has failed, it is possible to cope with failure in wireless communication. Thus, the reliability of the system which wirelessly connects the transmitting device and the receiving device can be improved.

In the communication system, the receiving device may include a display unit which displays an image based on the image data received by the second receiving unit.

According to this configuration, the device which receives and displays image data can determine whether the reception of a command has failed or not. Therefore, the reliability of the system including the display device can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
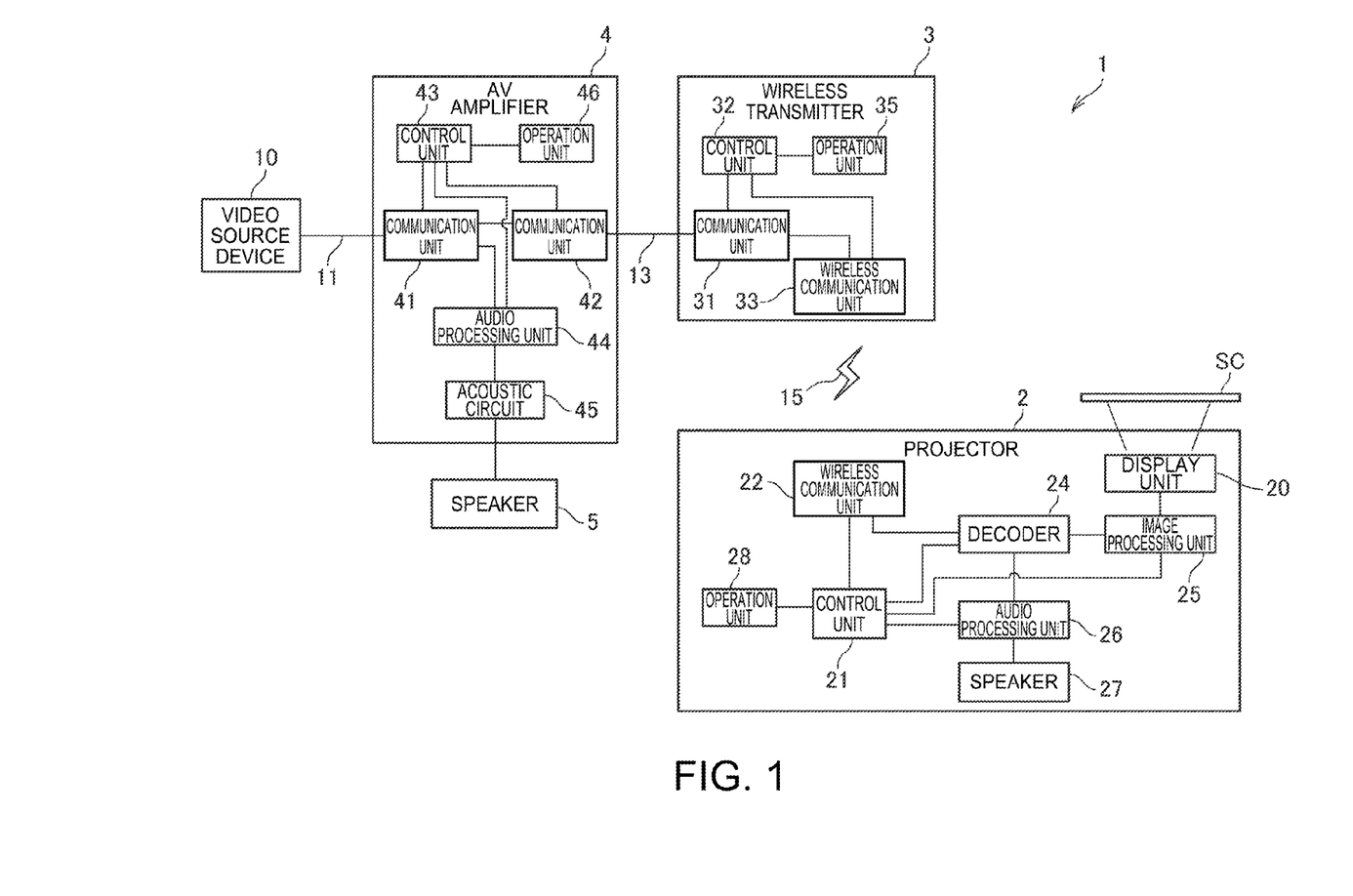
FIG. 1 is a block diagram showing the configuration of a display system according to an embodiment.

FIG. 1 is a block diagram showing the configuration of a display system 1 according to an embodiment to which the invention is applied.

The display system 1 has a projector 2, a wireless transmitter 3, and an AV (audio-visual) amplifier 4. A video source device 10 is connected to the AV amplifier 4. The AV amplifier 4 is connected to the wireless transmitter 3. The wireless transmitter 3 is connected to the projector 2 in a way that enables wireless communication. Also, a speaker 5 is externally connected to the AV amplifier 4. The wireless transmitter 3 is equivalent to the transmitting device according to the invention. The projector 2 is equivalent to the receiving device. The AV amplifier 4 is equivalent to the external device.

In this embodiment, an example in which the video source device 10, the AV amplifier 4, the wireless transmitter 3 and the projector 2 are connected via an HDMI (High-Definition Multimedia Interface) is described. The data transmitted and received by the video source device 10, the AV amplifier 4, the wireless transmitter 3 and the projector 2 include video data, audio data, and a CEC command as control data (control command), in the HDMI format.

The video source device 10 and the AV amplifier 4 are connected together via an HDMI cable 11, and the video source device 10 operates as a source device while the AV amplifier 4 operates as a sink device. The wireless transmitter 3 and the AV amplifier 4 are connected together via an HDMI cable 13, and the AV amplifier 4 operates as a source device while the wireless transmitter 3 operates as a sink device. The HDMI cables 11, 13 transmit data including video data, audio data, and a CEC command. The video source device 10 can transmit image data of a still image and video data of a dynamic image (video). In this embodiment, the case of transmitting video data is illustrated.

The wireless transmitter 3 and the projector 2 are connected together via a wireless communication link 15. The wireless communication link 15 is a wireless communication channel capable of transmitting video data, audio data, and control data. For example, Wireless HD (trademark registered) or the like capable of wirelessly transmitting HDMI data and CEC commands can be used. The specific configuration of the wireless communication link 15 is not limited to the above. For example, a wireless communication interface such as WHDI (trademark registered) (Wireless Home Digital Interface), WiGig (trademark registered), or IEEE 802.11ad (TGad) can be used. In the display system 1, HDMI data and CEC commands may be converted into data in a different format when these data and commands are transmitted via the wireless communication link 15.

Figure 2:
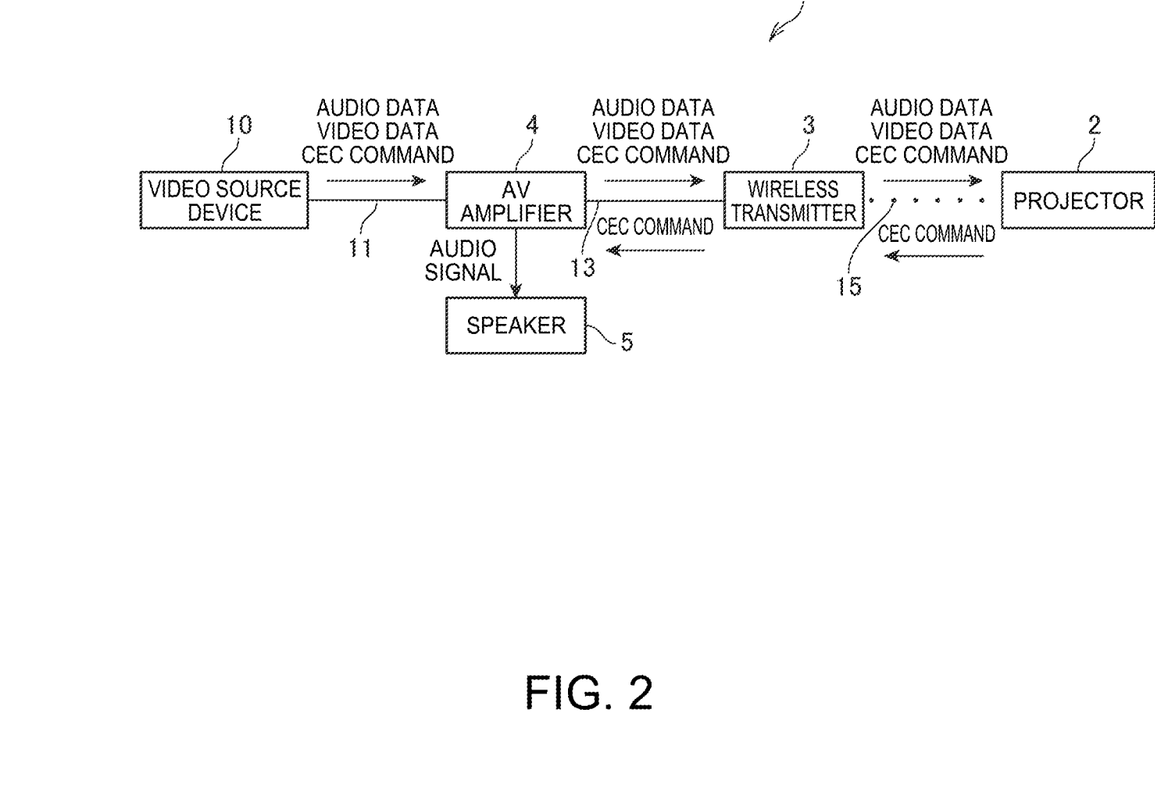
FIG. 2 is an explanatory view showing data and commands transmitted and received in the display system.

FIG. 2 is an explanatory view showing data and commands transmitted and received in the display system 1.

With the function of the HDMI interface, the projector 2, the wireless transmitter 3 and the AV amplifier 4 are connected in a daisy chain and perform pass-through transmission of video data, audio data, and a CEC command.

The video source device 10 transmits data including video data and audio data to the AV amplifier 4. The video source device 10 may also transmit data including a CEC command. The AV amplifier 4 generates an audio signal based on the audio data included in the data received from the video source device 10 and outputs the audio signal to the speaker 5. The speaker 5 then outputs a sound.

The AV amplifier 4 performs pass-through transmission of the data transmitted from the video source device 10, to the wireless transmitter 3. The wireless transmitter 3 receives the data transmitted from the AV amplifier 4 and transmits the data in the form of a wireless signal in the 60-GHz band to the projector 2. The projector 2 projects an image on a screen SC on the basis of the video data included in the data transmitted from the wireless transmitter 3.

The projector 2 has the function of generating a CEC command and transmitting the CEC command to the wireless transmitter 3. The wireless transmitter 3 receives the CEC command transmitted from the projector 2 and transmits the CEC command to the AV amplifier 4. The AV amplifier 4 receives the CEC command transmitted from the wireless transmitter 3. This CEC command is a command to inquire the operating state of the AV amplifier 4, as described later. In response to the received CEC command, the AV amplifier 4 generates a CEC command indicating the operating state and transmits this CEC command to the wireless transmitter 3. The wireless transmitter 3 wirelessly transmits this CEC command to the projector 2.

The video source device 10 shown in FIG. 1 is not particularly limited as long as it is a device capable of outputting video data and audio data. For example, the video source device 10 is a DVD (Digital Versatile Disk) playback device, Blu-Ray (trademark registered) playback device, television tuner device, CATV (cable television) set-top box, video game device, personal computer, or the like. Moreover, a portable device such as a portable video playback device or music playback device, mobile phone, smartphone, tablet computer or laptop computer can be used as the video source device 10. In this embodiment, the format of output data from the video source device 10 is not limited. Any HDMI format that can be used by the video source device 10 illustrated above may be used.

The AV amplifier 4 has communication units 41, 42, a control unit 43, an audio processing unit 44, an acoustic circuit 45, and an operation unit 46.

The communication units 41, 42 have a connector capable of connecting an HDMI cable, and an interface circuit, and execute data communication in the HDMI format. This interface circuit can be configured to have an HDMI receiver and an HDMI transmitter or the like. The communication units 41, 42 also have an HDMI controller and a CEC controller and may have a connection detection function, a CEC command detection function or the like.

The communication unit 41 is connected to the HDMI cable 11. The communication unit 42 is connected to the HDMI cable 13.

The operation unit 46 is connected to the control unit 43. The operation unit 46 has an operating element such as key switch for the user to perform an input operation. When the operating element is operated, the operation unit 46 outputs an operation signal to the control unit 43. The operation unit 46 may also be a receiving unit which receives a wireless signal transmitted from a remote controller (not shown). In this case, the operation unit 46 outputs an operation signal corresponding to the wireless signal received from the remote controller, to the control unit 43.

The control unit 43 controls the communication units 41, 42 and the audio processing unit 44. When data is received by the communication unit 41 from the video source device 10, the control unit 43 causes the communication unit 42 to transmit the received data to the wireless transmitter 3. Here, the communication unit 41 may not need control by the control unit 43 and may perform pass-through transmission to directly output the data received from the video source device 10. The control unit 43 also controls the audio processing unit 44 and the acoustic circuit 45 according to the operation on the operation unit 46. The control unit 43 designates processing of audio data in the audio processing unit 44, the gain in the acoustic circuit 45 and the like.

The audio processing unit 44 extracts audio data from the data received by the communication unit 41, generates an audio signal based on this audio data, and outputs the audio signal to the acoustic circuit 45. The audio processing unit 44 has, for example, a decoder which decodes audio data in the HDMI format, a D/A converter which converts digital audio data into an analog audio signal, and the like.

The acoustic circuit 45 amplifies the audio signal outputted from the audio processing unit 44 with the gain designated by the control unit 43, outputs the amplified audio signal to the speaker 5, and drives the speaker 5 to output a sound.

Here, the audio processing unit 44 and the acoustic circuit 45 may be configured as a digital amplifier and thus may amplify digital data without conversion into an analog audio signal and output the amplified data to the speaker 5. The speaker 5 may have any configuration that can output a sound. The speaker 5 may be an active speaker having circuit which amplifies an audio signal. The speaker 5 may also be a speaker to which digital data can be inputted, and may be a headphone which the user wears. The acoustic circuit 45 and the speaker 5 may be connected together via wireless communication.

The control unit 43 has the function of switching on and off the power of the AV amplifier 4 according to the operation on the operation unit 46. When the power is on, the AV amplifier 4 is in a normal operating state where the AV amplifier 4 can drive the speaker 5. When the power is off, the AV amplifier 4 in a standby through state. The standby through state is an operating state where the power of the main functions is switched off by the operation on the operation unit 46 but where the AV amplifier 4 is connected to a power source such as a power grid so that at least processing of a CEC command is available. The standby through state is a seemingly power-off state since the speaker 5 outputs no sound. However, pass through transmission of data from the video source device 10 to the wireless transmitter 3 can be performed.

When the operating state shifts from the normal operating state to the standby through state, or vice versa, the control unit 43 generates a CEC command indicating the operating state and transmits the CEC command to the wireless transmitter 3 from the communication unit 42.

If the data transmitted from the video source device 10 includes a CEC command and this CEC command is a command relating to the AV amplifier 4, the control unit 43 executes this command. Also, if a CEC command transmitted from the wireless transmitter 3 is received and the received command is a command relating to the AV amplifier 4, the control unit 43 executes this command.

The various operations to receive and analyze a CEC command and execute the command can be executed, whether the operating state is the normal operating state or the standby through state.

In this embodiment, if a CEC command inquiring the current operating state (normal operating state or standby through state) of the AV amplifier 4 is received, the control unit 43 generates a CEC command indicating the operating state as a response.

The wireless transmitter 3 has a communication unit 31, a control unit 32, a wireless communication unit 33, and an operation unit 35. The communication unit 31 has a connector capable of connecting an HDMI cable, and an interface circuit, and is configured similarly to the communication units 41, 42.

The communication unit 31 (first receiving unit) is connected to the HDMI cable 13. The communication unit 31 is configured similarly to the communication unit 41 provided in the AV amplifier 4 and transmits and receives video data, audio data and a CEC command in the HDMI format to and from the communication unit 42 via the HDMI cable 13. The communication unit 31 outputs the data received from the AV amplifier 4 to the wireless communication unit 33. The communication unit 31 also transmits the CEC command inputted from the wireless communication unit 33 to the AV amplifier 4 via the HDMI cable 13.

The control unit 32 (transmission control unit) controls the communication unit 31 and the wireless communication unit 33 and thus controls data communication with the AV amplifier 4 and data communication with the projector 2. The operation unit 35 is connected to the control unit 32. The operation unit 35 has an operating element such as a key switch for the user to perform an input operation, and outputs an operation signal to the control unit 32 when the operating element is operated. The operation unit 35 may be a receiving unit which receives a wireless signal transmitted from a remote controller (not shown). In this case, the operation unit 35 outputs an operation signal corresponding to the wireless signal received from the remote controller, to the control unit 32.

The wireless communication unit 33 (first transmitting unit) establishes the wireless communication link 15 with the projector 2. When the communication unit 31 outputs the data received from the AV amplifier 4, the wireless communication unit 33 receives this data and transmits the data to the projector 2 via the wireless communication link 15. Meanwhile, when a CEC command is received from the projector 2, the wireless communication unit 33 outputs the received CEC command to the communication unit 31 and the control unit 32. The communication unit 31 performs pass-through transmission of the CEC command inputted from the wireless communication unit 33, to the AV amplifier 4.

The control unit 32 acquires the CEC command included in the data received by the communication unit 31 from the AV amplifier 4, and generates a new CEC command corresponding to the acquired command. The control unit 32 causes the wireless communication unit 33 to transmit the generated CEC command to the projector 2. Also, when the wireless communication unit 33 receives a CEC command from the projector 2 and this CEC command is inputted from the communication unit 31, the control unit 32 analyzes the inputted command.

The projector 2 has a display unit 20, a control unit 21, a wireless communication unit 22, a decoder 24, an image processing unit 25, an audio processing unit 26, a speaker 27, and an operation unit 28.

The display unit 20 has a light source, a light modulator which modulates the light emitted from the light source and thus generates an image light, and an optical system which projects the image light on the screen SC, or the like. The light source has a lamp such as a xenon lamp or ultra-high-pressure mercury lamp, or a solid-state light source such as an LED (light emitting diode) or laser light source. The display unit 20 may have a drive circuit which supplies electric power or a pulse signal to turn the light source on. The display unit 20 may also have a reflector, a lens group (not shown) to enhance optical characteristics of projection light, a polarizer, a light diffusion member which diffuses the light emitted from the light source, a scanning mechanism for scanning with the light emitted from the light source, a dimmer element which reduced the light emitted from the light source, or the like. Also, an optical part may be provided which divides the light emitted from the light source into three color lights R, G, B.

The light modulator modulates the light emitted from the light source, for example, with a transmission-type or reflection-type liquid crystal light valve or with a digital mirror device. The display unit 20 may have a drive circuit which drives the liquid crystal light valve or the digital mirror device of the light modulator.

The projection system has a lens group which condenses the image light generated by the light modulator. The projection system may have a lens group including a zoom lens for enlargement/reduction and focus adjustment of the projection image, a mechanism which moves the lens to adjust zooming and focusing, or the like.

The control unit 21 (reception control unit) controls each unit in the projector 2 so as to project (display) an image on the screen SC on the basis of the data received by the wireless communication unit 22 from the wireless transmitter 3.

The wireless communication unit 22 (second receiving unit, second transmitting unit) establishes the wireless communication link 15 with the wireless communication unit 33 and receives data including video data, audio data and a CEC command via the wireless communication link 15. The wireless communication unit 22 also transmits a command generated by the control unit 21 to the wireless transmitter 3 via the wireless communication link 15.

The control unit 21 causes the data received by the wireless communication unit 22 to be inputted to the decoder 24. The decoder 24, under the control of the control unit 21, decodes the video data included in the data received by the wireless communication unit 22 and outputs the decoded video data to the image processing unit 25. The image processing unit 25 generates an image signal for driving the light modulator of the display unit 20, on the basis of the data decoded by the decoder 24. The image processing unit 25 may execute various kinds of processing to adjust the projection image under the control of the control unit 21. Such kinds of processing include resolution conversion processing on the video data, frame rate conversion processing, distortion correction processing to correct a keystone distortion of the projection image on the screen SC by deforming the image, zooming processing to enlarge or reduce the video data, color tone correction processing to change the color tone of the video data, luminance correction processing to change the luminance of the video data, and the like. Also, when 3D (stereoscopic) video data is inputted, the image processing unit 25 may execute 3D image conversion processing to generate a frame to be displayed by the light modulator of the display unit 20 according to the 3D video data format.

The decoder 24, under the control of the control unit 21, outputs the audio data included in the data received by the wireless communication unit 22 to the audio processing unit 26. The audio processing unit 26 causes the speaker 27 to output a sound on the basis of the audio data decoded by the decoder 24. The audio processing unit 26, for example, converts the audio data into an analog audio signal, amplifies the analog audio signal with the gain designated by the control unit 21, outputs the analog audio signal to the speaker 27, and causes the speaker 27 to output a sound. The audio processing unit 26 may have an acoustic circuit including a D/A converter which converts the digital data into an analog audio signal and an amplifier which amplifies the analog audio signal. The audio processing unit 26 may also amplify the digital data without conversion into an analog audio signal and then output the amplified signal to the speaker 27.

The speaker 27 is a built-in speaker provided in the main body of the projector 2 and may be a monophonic speaker or stereo speaker or may be a multi-channel speaker including a woofer. The speaker 27 may also be a speaker capable of taking in digital data. Moreover, a headphone worn by the user can be used as the speaker 27, and in this case, the projector 2 may have an output terminal capable of connecting a cable to output an audio signal to the speaker 27, or a transmitter which wirelessly transmits an audio signal to the speaker 27.

The display system 1 has the AV amplifier 4 which outputs a sound to the speaker 5. Therefore, when the AV amplifier 4 is in the power-off state (the above standby through state), the projector 2 outputs a sound from the speaker 27. When the AV amplifier 4 is in the normal operating state, the projector 2 does not output a sound from the speaker 27.

The control unit 21 analyzes the CEC command included in the data received by the wireless communication unit 22 and detects the CEC command indicating the operating state of the AV amplifier 4. The control unit 21 determines whether the AV amplifier 4 is in the normal operating state or in the standby through state, on the basis of the detected CEC command, and stores the result of the determination in a built-in storage unit (not shown) provided in the control unit 21. The control unit 21 switches on and off the output of the audio signal from the audio processing unit 26 to the speaker 27 on the basis of the result of the determination on the operating state of the AV amplifier 4.

In the display system 1, data including video data, audio data and a CEC command is wirelessly transmitted from the wireless transmitter 3 to the projector 2 via the wireless communication link 15. Meanwhile, if the communication state of the wireless communication link 15 deteriorates temporarily due to external influence such as an obstacle or noise, it is conceivable that the projector 2 cannot receive the data transmitted from the wireless transmitter 3. Normally, the deterioration of this type in the communication state is temporary, and there is a high possibility that such influence can be avoided simply by the projector 2 performing error correction processing with respect to video data and audio data. Even if the influence cannot be coped with by error correction, it is conceivable that only temporary disturbance occurs in the video and audio. However, if the projector 2 cannot receive the CEC command due to the deterioration in the communication state, the operation of the projector 2 can be affected.

Specifically, if the projector 2 cannot receive the CEC command indicating the operating state transmitted from the AV amplifier 4, the operating state of the AV amplifier 4 determined by the projector 2 may become inconsistent with the actual operating state of the AV amplifier 4. For example, a situation where the AV amplifier 4 shifts to the standby through state and stops audio output from the speaker 5 while the projector 2 does not output any sound from the speaker 27, may occur.

Thus, in the display system 1, the projector 2 has a configuration to be able to accurately determine the operating state of the AV amplifier 4 even if the CEC command cannot be received.

Figure 3:
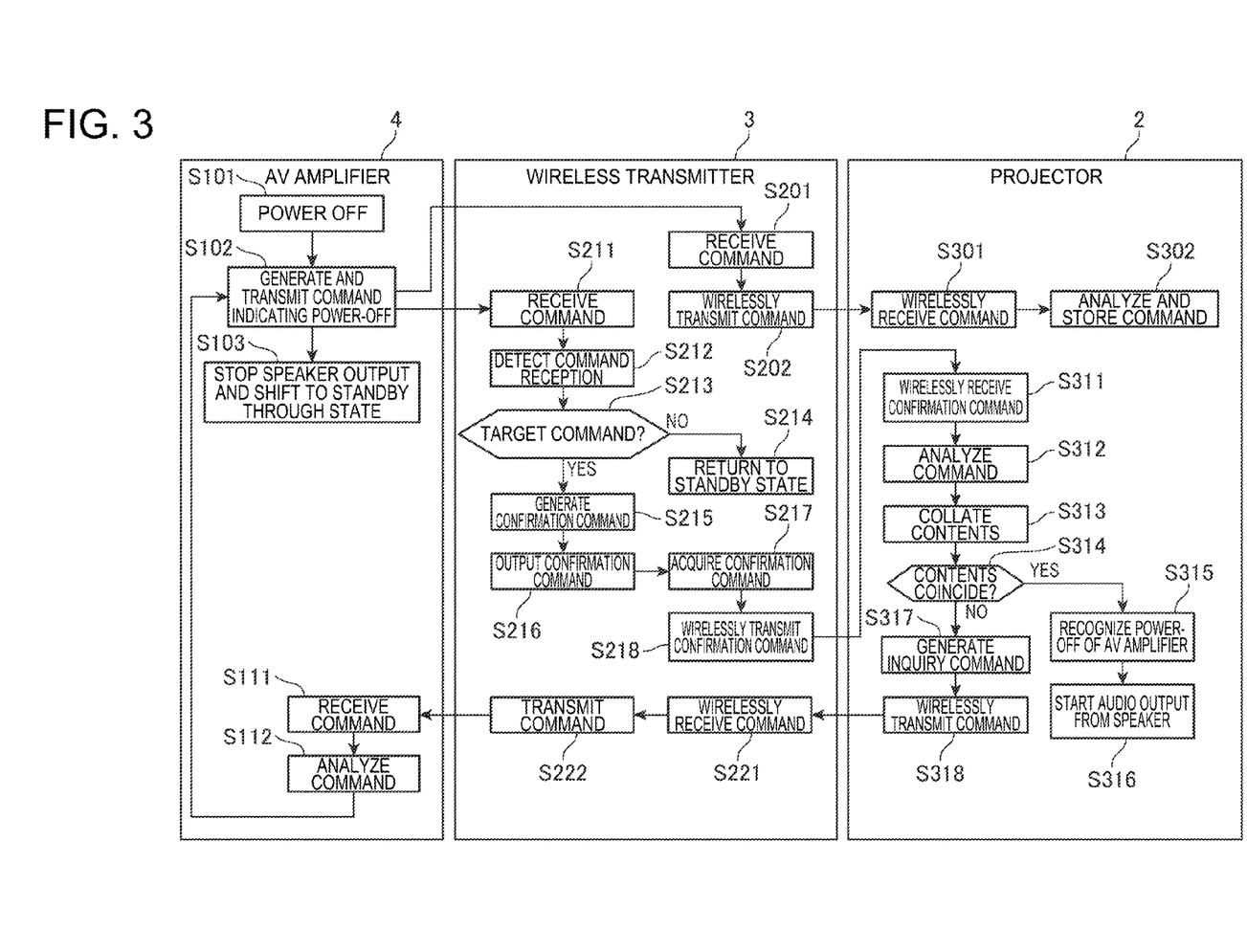
FIG. 3 is a sequence chart showing the operation of each unit in the case where commands are transmitted and received in the display system.

FIG. 3 is a sequence chart showing operations in the display system 1, and specifically, operations involved in the transmission and reception of a CEC command in the case where the operating state of the AV amplifier 4 is changed. In FIG. 3, the operations of the AV amplifier 4, wireless transmitter 3, and the projector 2 are shown respectively.

When power-off is designated by an operation on the operation unit 46 or by the remote controller (Step S101), the control unit 43 of the AV amplifier 4 generates a CEC command (first command) indicating power-off (standby through state) and causes the communication unit 42 to transmit the CEC command (Step S102). This CEC command is, for example, a "Set System Audio Mode: OFF" command defined by the CEC standard.

In Step S102, the AV amplifier 4 can transmit the CEC command along with the video data and the audio data transmitted to the AV amplifier 4 from the video source device 10. For example, processing to include the CEC command generated by the control unit 43 into the data transmitted to the AV amplifier 4 from the video source device 10 can be carried out and the processed data can be transmitted from the communication unit 42.

The control unit 43 controls each unit in the AV amplifier 4 to stop the output of a sound from the speaker 5 and then shifts to the standby through state (Step S103).

In the standby through state, the control unit 43 can perform pass-through transmission in which the data received by the communication unit 41 is transmitted from the communication unit 42, detection and analysis of the CEC command received by the communication units 41, 42, and execution of the command.

The communication unit 31 of the wireless transmitter 3 receives the data including the CEC command transmitted from the AV amplifier 4 in Step S102 (Step S201), and transfers the received data to the wireless communication unit 33. The wireless communication unit 33 wirelessly transmits the data to the projector 2 (step S202).

The wireless communication unit 22 of the projector 2 receives the data transmitted from the wireless transmitter 3 (Step S301). The control unit 21 analyzes the CEC command included in the data received by the wireless communication unit 22 and stores the content of the CEC command (Step S302). Particularly, in this embodiment, if the "Set System Audio Mode: OFF" command generated by the AV amplifier 4 is received, the data indicating the operating state of the AV amplifier 4 is stored, or the stored data is updated.

When the AV amplifier 4 shifts from the standby through state to the normal operating state, the AV amplifier 4 can generate a CEC command indicating the normal operating state and transmit the CEC command, as in Step S102. This CEC command is analyzed and stored by the control unit 21 with similar operations to Steps S201 to S202 and Steps S301 to S302. Therefore, the control unit 21 stores the operating state of the AV amplifier 4 when the AV amplifier 4 shifts to the standby through state and when the AV amplifier 4 shifts to the normal operating state.

When the communication unit 31 receives data including a CEC command (Step S211), the control unit 32 of the wireless transmitter 3 detects that the received data includes a CEC command (Step S212).

The control unit 32 has the function of generating a confirmation command (second command) in preparation for the case where the projector 2 cannot receive the CEC command transmitted from the AV amplifier 4. The control unit 32 generates a confirmation command and transmits the confirmation command to the projector 2, if a preset condition is met. The preset condition is, for example, that the CEC command included in the data received from the AV amplifier 4 is a command of a type that is set in advance.

The control unit 32 determines whether the command detected in Step S212 is a command that is set as a target to generate a confirmation command, or not (Step S213). If the command does not correspond to the set command (Step S213, No), the control unit 32 returns to a standby state (Step S214). The standby state is the state where the control unit 32 can operate in response to the CEC command transmitted from the AV amplifier 4 and the projector 2, that is, it can be regarded as the normal operating state. The control unit 32 is in the standby state before executing the operations of Steps S201 and S211 in FIG. 3.

If the command detected in Step S212 is a command that is set as a target to generate a confirmation command (Step S213, Yes), the control unit 32 generates a confirmation command (Step S215). This confirmation command is categorized as a Vender Specific command which is permitted to extend under the CEC standard. In this embodiment, the control unit 32 generates a confirmation command when the "Set System Audio Mode: OFF" command transmitted from the AV amplifier 4 is detected. Also, the CEC command transmitted in the case where the AV amplifier 4 shifts from the standby through state to the normal operating state can be set as a target to generate a confirmation command. In this case, discrimination can be made between the confirmation command generated by the control unit 32 corresponding to the "Set System Audio Mode: OFF" command, and the confirmation command generated by the control unit 32 corresponding to the CEC command transmitted in the case where the AV amplifier 4 shifts to the normal operating state.

The control unit 32 outputs the confirmation command to the wireless communication unit 33 (Step S216). The wireless communication unit 33 acquires the confirmation command from the control unit 32 (Step S217) and wirelessly transmits the confirmation command to the projector 2 (Step S218). In Step S218, the wireless communication unit 33 can transmit the CEC command (confirmation command) along with the video data and the audio data transmitted from the AV amplifier 4. For example, processing to include the CEC command (confirmation command) generated by the control unit 32 into the data transmitted to the wireless transmitter 3 from the AV amplifier 4 can be executed and the processed data can be transmitted to the projector 2.

The wireless communication unit 22 of the projector 2 receives the confirmation command wirelessly transmitted from the wireless transmitter 3 (Step S311). The control unit 21 analyzes the received confirmation command (Step S312). The control unit 21 collates the content indicated by the confirmation command with the content stored in Step S302 (Step S313).

In this embodiment, the confirmation command indicates that the AV amplifier 4 has shifted to the standby through state. The control unit 21 determines whether the operating state of the AV amplifier 4 stored before Step S311 and the operating state of the AV amplifier 4 indicated by the confirmation command received in Step S311 coincide with each other or not (Step S314).

If the stored content and the content of the received confirmation command coincide with each other (Step S314, Yes), the control unit 21 recognizes the power-off (standby through state) of the AV amplifier 4 (Step S315) and starts the output of a sound from the speaker 27 (Step S316).

If the stored content and the content of the received confirmation command do not coincide with each other (Step S314, No), the control unit 21 generates an inquiry CEC command (third command) (Step S317). This inquiry command is, for example, a "Get System Audio Mode Status" command defined by the CEC standard. The control unit 21 transmits the generated inquiry command to the wireless transmitter 3 via the wireless communication unit 22 (Step S318).

As the control unit 32 detects that the inquiry command transmitted from the projector 2 is received by the wireless communication unit 33 (Step S221), the control unit 32 transmits this inquiry command to the AV amplifier 4 via the communication unit 31 (Step S222). The operations of Steps S221 to S222 may be pass-through transmission which is not controlled by the control unit 32.

In the AV amplifier 4, the communication unit 42 receives the inquiry command (Step S111) and the control unit 43 analyzes the received command (Step S112). As the control unit 43 recognizes that the received command is a "Get System Audio Mode Status" command, the control unit 43, in response to this command, generates and transmits a command indicating the operating state (standby through state) of the AV amplifier 4 (Step S102).

In this way, in the display system 1, as the AV amplifier 4 transmits a CEC command indicating the operating state, the projector 2 stores the content of the CEC command. The wireless transmitter 3 generates a confirmation command indicating the content of the CEC command and transmits the confirmation command to the projector 2. The projector 2 collates the content of the CEC command generated by the AV amplifier 4 with the content of the confirmation command generated by the wireless transmitter 3 and determines whether the contents of these commands coincide with each other or not. By this determination, the projector 2 can determine whether the reception of the CEC command generated by the AV amplifier 4 is successful or unsuccessful. The timing when the wireless transmitter 3 transmits the CEC command generated by the AV amplifier 4 to the projector 2 and the timing when the wireless transmitter 3 transits the confirmation command to the projector 2 do not perfectly coincide with each other. There is at least a difference in timing by the amount of processing delay for the wireless transmitter 3 to generate the confirmation command. Also, the wireless transmitter 3 may perform processing to shift the timing of transmitting the confirmation command from the timing when the CEC command generated by the AV amplifier 4 is transmitted. That is, the timing when the projector 2 receives the command generated by the AV amplifier 4 and the timing when the projector 2 receives the confirmation command generated by the wireless transmitter 3 may be made different from each other under the control of the wireless transmitter 3.

Therefore, if the communication state of the wireless communication link 15 temporarily deteriorates and the projector 2 cannot receive the CEC command generated by the AV amplifier 4, the projector 2 can determine and detect the absence of the CEC command. Thus, the projector 2 can operate according to the actual operating state of the AV amplifier 4.

Moreover, if the content of the CEC command generated by the AV amplifier 4 and the content of the confirmation command generated by the wireless transmitter 3 do not coincide with each other, the projector 2 generates an inquiry command. In response to this, the AV amplifier 4 generates and transmits a CEC command indicating the operating state again. Thus, the projector 2 compares the content of the CEC command generated by the AV amplifier 4 with the content of the confirmation command generated by the wireless transmitter 3 and determines whether the contents of these commands coincide with each other or not. Therefore, the projector 2 can recognize the actual operating state of the AV amplifier 4 more securely.

As described above, in the display system 1 according to the embodiment to which the invention is applied, the wireless transmitter 3 receives video data and a CEC command from the AV amplifier 4 and determines whether the received CEC command is a preset command or not. If it is determined that the received CEC command is a preset CEC command, the wireless transmitter 3 generates a confirmation command and transmits the video data and the CEC command received from the AV amplifier 4 and the confirmation command to the projector 2. The projector 2 receives the video data, the CEC command and the confirmation command transmitted from the wireless transmitter 3 and determines whether the received CEC command and confirmation command correspond to each other or not. Thus, if the projector 2 cannot receive the CEC command transmitted from the wireless transmitter 3, the projector 2 can detect the failure in this reception. Therefore, the projector 2 can detect and cope with communication failure.

Also, if it is determined that the CEC command and the confirmation command received from the wireless transmitter 3 do not coincide with each other, the projector 2 generates an inquiry command and transmits the inquiry command to the wireless transmitter 3. Therefore, if the projector 2 determines that the reception of the CEC command is unsuccessful, the projector 2 can cause the wireless transmitter 3 to execute an operation to cope with this failure. Thus, the projector 2 and the wireless transmitter 3 can collaboratively cope with communication failure.

In the display system 1, if the projector 2 transmits an inquiry command, the AV amplifier 4 may generate and transmit a CEC command indicating the operating state and the wireless transmitter 3 may generate and transmit a confirmation command. Thus, the projector 2 can detect and cope with communication failure.

In the display system 1, the wireless transmitter 3 and the projector 2 transmit and receive data in the HDMI format. The command transmitted from the AV amplifier 4 is a command already defined by the CEC. The confirmation command is a Vender Specific command. Therefore, communication failure can be coped with by a technique conforming to the HDMI format, utilizing the Vender Specific command of the CEC.

The wireless transmitter 3 wirelessly transmits video data and a CEC command to the projector 2. The projector 2 receives the video data and the CEC command wirelessly transmitted from the wireless transmitter 3. Therefore, if the projector 2 executes wireless communication in which the communication state can deteriorate due to external influence, the projector 2 can cope with this wireless communication failure. Thus, the reliability of the display system 1 in which the wireless transmitter 3 and the projector 2 are connected via wireless communication can be improved.

As a configuration for this, the wireless transmitter 3 has the communication unit 31 which receives video data and a CEC command from the AV amplifier 4, the wireless communication unit 33 which transmits a command to the projector 2, and the control unit 32 which determines whether the CEC command received by the communication unit 31 is a preset command or not, and which generates a confirmation command and causes the wireless communication unit 33 to transmit the video data and the CEC command received by the communication unit 31 and the confirmation command, if it is determined that the CEC command is a preset command. The projector 2 has the wireless communication unit 22 which receives the video data, the CEC command and the confirmation command transmitted from the wireless transmitter 3, and the control unit 21 which determines whether the CEC command and the confirmation command received by the wireless communication unit 22 correspond to each other or not. Therefore, if the projector 2 cannot receive the CEC command transmitted from the wireless transmitter 3, the projector 2 can detect this failure in reception. Thus, projector 2 can detect and cope with communication failure.

The wireless communication unit 22 of the projector 2 transmits a command to the wireless transmitter 3. If the control unit 21 determines that the CEC command and the confirmation command received by the wireless communication unit 22 do not correspond to each other, the control unit 21 generates an inquiry command and causes the wireless communication unit 22 to transmit the inquiry command to the wireless transmitter 3. The projector 2 also has the display unit 20 which displays an image based on the video data received by the wireless communication unit 22.

The embodiment is only an example of a specific form to which the invention is applied and is not intended to limit the invention. The invention can be applied in different forms from the embodiment. For example, while the configuration in which the projector 2 stops or starts audio output from the speaker 2 according to the operating state of the AV amplifier 4 is described as an example in the embodiment, this is only an example and the invention is not limited to this. The invention can be applied to any configuration in which the projector 2 as a receiving device switches between operations according to a command transmitted from an external device connected to the wireless transmitter 3 as a transmitting device. For example, the invention can also be applied to a configuration in which a different display device from the projector 2 is connected to the wireless transmitter 3 and in which the projector switches on and off the display on the screen SC according to the switching on/off of the power of the display device. The number of devices connected to the wireless transmitter 3 is not limited. The display device and the AV amplifier 4 may be connected to the wireless transmitter 3, or another display device may be connected to the AV amplifier 4. Alternatively, a different video source device from the video source device 10 may be connected to the AV amplifier 4. Moreover, more devices than the devices shown in FIG. 1 may be connected in a daisy chain. Also, for example, a configuration in which the video source device 10 is connected to the wireless transmitter 3 and in which the projector 2 controls operations according to a command transmitted from the video source device 10 may be employed. The projector 2 may display video data stored in a built-in storage unit (not illustrated), for example, according to the switching off of the power of the video source device 10. Also, the condition for the wireless transmitter 3 to generate a confirmation command is not limited to a command indicating the power-on/off of the device connected to the wireless transmitter 3. For example, if a command indicating that a new device is connected to the display system 1, or a command indicating change of the video format, or the like is transmitted, the wireless transmitter 3 may generate a confirmation command and execute the operation described with reference to FIG. 3.

The display device according to the invention is not limited to the projector 2 which projects an image on the screen SC. Various display devices, such as self-emitting display devices like a liquid crystal monitor or liquid crystal television which displays an image/video on a liquid crystal display panel, a monitor device or television receiver which displays an image/video on a PDP (plasma display panel), or a monitor device or television receiver which displays an image/video on an organic EL display panel called OLED (organic light-emitting diode) or OEL (organic electroluminescence), are included in the image display device according to the invention. In this case, the liquid crystal display panel, the plasma display panel, and the organic EL display panel are equivalent to the display unit.

Each of the functional units in the display system 1 shown in FIG. 1 is described as a functional configuration realized by the cooperation of hardware and software, and the specific embodiment thereof is not particularly limited. Therefore, hardware corresponding to each individual functional unit need not necessarily be installed therein. As a matter of course, it is possible to employ a configuration in which the functions of a plurality of functional units are realized by a single processor executing programs. Also, a part of the functions realized by software in the embodiment may be realized by hardware, or apart of the functions realized by hardware may be realized by software. Also, the specific configuration of each of the other units in the display system 1 can be arbitrarily changed without departing from the scope of the invention.

What is claimed is:

1. A communication control method for transmitting a command from a transmitting device to a display device via a wireless connection, the method comprising:
   receiving, by the transmitting device from an external device communicatively connected to the transmitting device, the command and one or more of image data and audio data, the command indicating an operating state of the external device;
   transmitting, by the transmitting device by way of the wireless connection, the command and the one or more of the image data and the audio data to the display device;
   determining, by the transmitting device, whether the command is a predetermined first command configured to trigger generation of a confirmation command;
   if it is determined that the command is not the predetermined first command, returning, by the transmitting device, to an operating state of the transmitting device immediately prior to the receiving of the command; and
   if it is determined that the command is the predetermined first command, performing:
      generating, by the transmitting device, the confirmation command, the confirmation command indicating a content of the command received from the external device; and
      transmitting, by the transmitting device by way of the wireless connection, the confirmation command to the display device for comparison, by the display device, with stored content indicating the operating state of the external device.

2. The communication control method according to claim 1, further comprising:
   receiving, by the display device, the confirmation command from the transmitting device;
   determining, by the display device, whether the confirmation command and the stored content indicating the operating state of the external device correspond to each other;
   if it is determined that the confirmation command and the stored content indicating the operating state of the external device correspond to each other, switching, by the display device, an operating state of the display device based on the operating state of the external device; and
   if it is determined that the confirmation command and the stored content indicating the operating state of the external device do not correspond to each other, performing:
      generating, by the display device, an inquiry command configured to request a status of the operating state of the external device, and
      transmitting, by the display device, the inquiry command to the transmitting device.

3. The communication control method according to claim 1, wherein
   the transmitting device and the display device transmit and receive data in a High-Definition Multimedia Interface ("HDMI") format,
   the command is a command already defined by the Consumer Electronics Control ("CEC"), and
   the confirmation command is a Vender Specific command.

4. The communication control method according to claim 1, further comprising:
   receiving, by the external device, a user input operation configured to switch the operating state of the external device;
   switching, by the external device, the operating state of the external device in accordance with the user input operation;
   generating, by the external device in response to the switching of the operating state of the external device, the command indicating the operating state of the external device; and
   transmitting, by the external device, the command to the transmitting device.

5. The communication control method according to claim 1, further comprising:
   in response to a determination by the display device that the stored content indicating the operating state of the external device and the confirmation command do not correspond to each other, performing:
      receiving, by the transmitting device, an inquiry command from the display device, the inquiry command configured to request a status of the operating state of the external device, and
      transmitting, by the transmitting device, the inquiry command to the external device.

6. The communication control method according to claim 5, further comprising:
   receiving, by the external device, the inquiry command from the transmitting device;
   generating, by the external device, another command indicating the operating state of the external device; and
   transmitting, by the external device, the another command to the transmitting device.

7. The communication control method according to claim 6, further comprising:
   receiving, by the transmitting device from the external device in response to reception of the inquiry command by the external device, the another command generated by the external device; and
   transmitting, by the transmitting device by way of the wireless network, the another command to the display device.

8. The communication control method according to claim 1, wherein the display device comprises at least one of a projector, a self-emitting display device, and a display device receiver.

9. The communication control method according to claim 1, wherein the external device comprises at least one of an audio-visual amplifier, another display device, and a video source device.

10. A communication system comprising a transmitting device,
   the transmitting device including:
      a first receiving unit which receives a command and one or more of image data and audio data from an external device, the command indicating an operating state of the external device;
      a first transmitting unit which transmits the command and the one or more of the image data and the audio data to a display device; and
      a transmission control unit which
         determines whether the command received by the first receiving unit is a predetermined first command configured to trigger generation of a confirmation command, if it is determined that the command is not the predetermined first command, returns the transmitting device to an operating state immediately prior to the reception of the command by the first receiving unit, and if it is determined that the command is the predetermined first command, generates the confirmation command indicating a content of the command received by the first receiving unit, and causes the first transmitting unit to transmit the confirmation command to the display device by way of a wireless connection for comparison, by the display device, with stored content indicating the operating state of the external device.

11. The communication system according to claim 10, further comprising a display device, wherein the display device includes:

a second receiving unit configured to receive the command, the one or more of the image data and the audio data, and the confirmation command transmitted from the transmitting device, a second transmitting unit configured to transmit an inquiry command to the transmitting device, the inquiry command configured to request a status of the operating state of the external device, and a reception control unit which:

determines whether the confirmation command received by the second receiving unit and the stored content indicating the operating state of the external device correspond to each other, if it is determined that the confirmation command and the stored content indicating the operating state of the external device correspond to each other, switches an operating state of the display device based on the operating state of the external device, and if it is determined that the confirmation command and the stored content indicating the operating state of the external device do not correspond to each other, generates the inquiry command and causes the second transmitting unit to transmit the inquiry command to the transmitting device.

12. The communication system according to claim 11, wherein the first transmitting unit provided in the transmitting device is a wireless transmission unit which wirelessly transmits the command and the one or more of the image data and the audio data, and the second receiving unit provided in the display device is a wireless reception unit configured to receive the command and the one or more of the image data and the audio data wirelessly transmitted from the first transmitting unit.

13. The communication system according to claim 11, wherein the display device includes a display unit which displays an image based on the image data received by the second receiving unit.

* * * * *